Figures 1, 2:
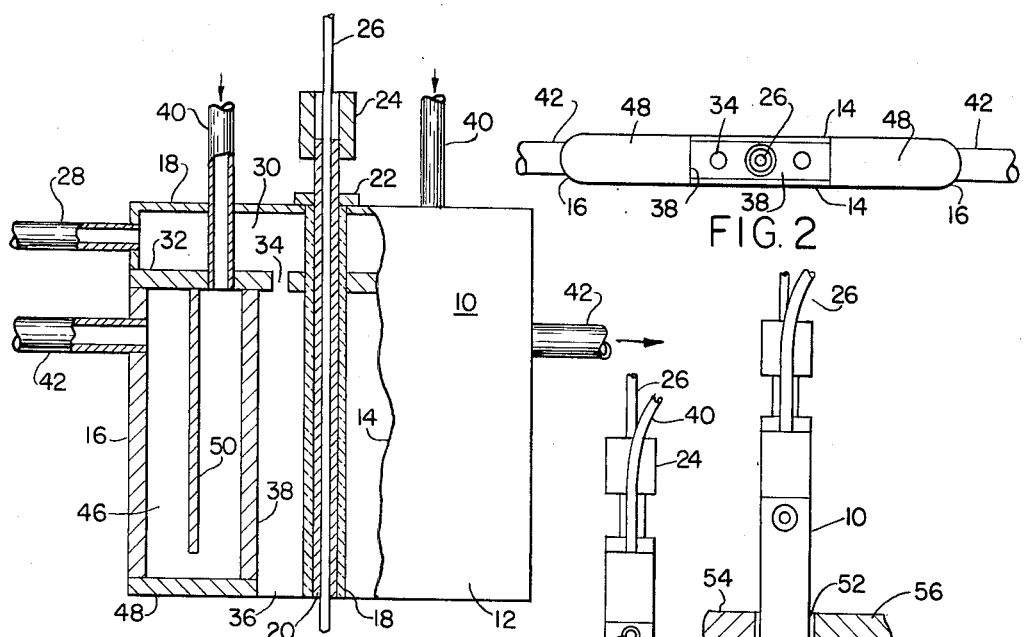

Oct. 5, 1965     S. S. WHITE     3,210,515
ARC WELDING DEVICE
Filed April 15, 1963

INVENTOR.
SHELDON S. WHITE
BY Morse & Altman
ATTORNEYS

United States Patent Office 3,210,515
Patented Oct. 5, 1965

3,210,515
ARC WELDING DEVICE
Sheldon S. White, Winthrop, Mass., assignor to Alloyd Electronics Corporation, Cambridge, Mass., a corporation of Massachusetts
Filed Apr. 15, 1963, Ser. No. 273,116
2 Claims. (Cl. 219—74)

This invention relates generally to arc welding, and more particularly comprises a new and improved arc welding torch adapted to weld heavy plate metal rapidly and with a minimum amount of weld material. More specifically, this invention is directed towards an improved MIG type of welding gun for application in making high depth-to-width ratio fusion zones.

Arc welding refers generally to a technique for joining metals by forming an electric arc between an electrode and the work. Usually the electrodes are consumable and are melted continuously by the arc as the welding gun traverses the work. In arc welding using consumable electrodes, both the electrode and some of the base metal form a pool of weld metal which, after freezing, becomes the weld.

Various types of arc welding techniques have been developed and these include the MIG type guns (metal inert gas) where a flow of inert gas is supplied to the welding area to shield the arc and the welded material. This technique is particularly useful in welding reactive metals, such as titanium, which react with siliceous fluxes and in welding metal such as aluminum and stainless steel, the corrosion resistance of which suffers in the presence of flux residues. In addition, the presence of the inert gas permits the use of higher currents than would otherwise be possible.

In arc welding heavy plate metal, such as 3″ or more in thickness for example, the practice has been to start with a V-shaped trough which may be formed on either one or both sides of the work piece and the weld completed by filling the two troughs with weld material. Because of the large volume involved in the V-troughs, fifty to one hundred or more welding passes, in various combinations of flat, vertical or overhead positions are required. In addition, the resulting weld is accompanied by excessive losses in strength and dimensional stability. Also, the total man hours required to complete such a weld adds considerably to the cost of the work. Other problems created by conventional arc welding of thick plates include the development of excessive amounts of heat, which in turn leads to undesirable softening of the work. Heretofore, the primary difficulty in obtaining fine grained high depth-to-width ratio welds with an arc source has always been the relatively low power density of the arc.

Accordingly, it is an object of the present invention to provide improvements in arc welding devices.

Another object of this invention is to provide a new and improved MIG type arc welding torch capable of a high current flow and being particularly useful in welding thick materials.

Still another object of this invention is to provide a new and improved MIG type arc welding gun capable of welding thick materials with a minimum number of passes at a high rate of speed and accompanying deposition rates while consuming a minimum amount of weld metal.

Yet another object of this invention is to provide an arc welding torch adapted to produce a weld between sections of thick material characterized by a joint that is stronger and more durable than joints formed by existing equipment and techniques.

More particularly, this invention features a MIG type arc welding torch, characterized by a slim, elongated body which is dimensioned to fit within a narrow gap or groove formed by the opposing edges of the work to be joined. The torch is provided with an integral cooling system and includes a gas feeding system capable of delivering a large and continuous flow of inert gas to the welding zone. The configuration of the gun in cooperation with its ability to handle a high rate of gas flow and to withstand the high temperature levels inherent in the operation of the torch permits the gun to produce rapidly and at a low cost welds of improved characteristics, particularly in the joining of heavy sections of metal.

Figures 3, 4, 5:
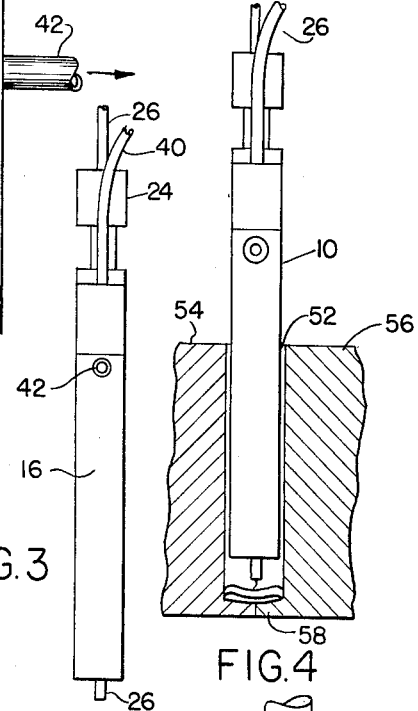
Figure 6:
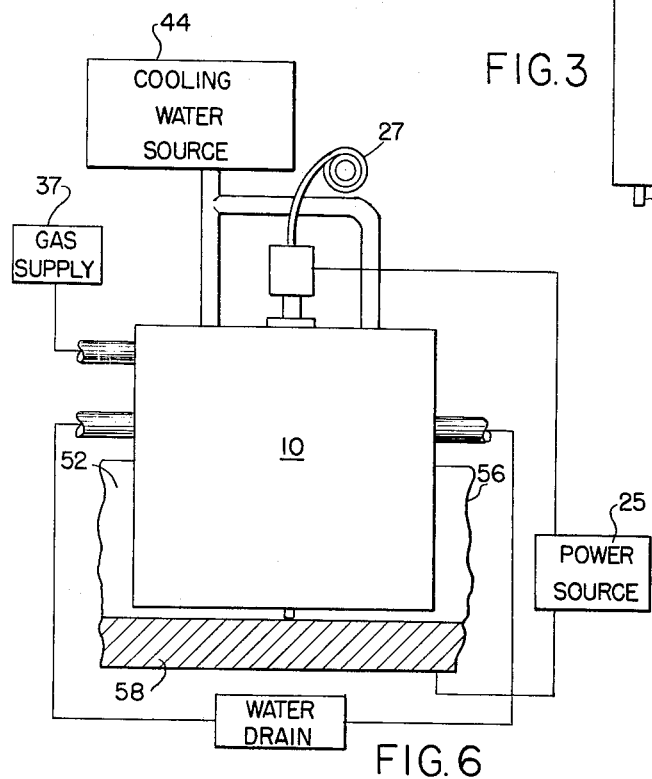

But these and other features of the invention, along with further objects and advantages thereof, will become more readily apparent from the following detailed description of a preferred embodiment of the invention with reference being made to the accompanying drawings, in which:

FIGURE 1 is a view in side elevation, partly in section, of an arc welding torch made according to the invention,
FIGURE 2 is a bottom plan view of the gun,
FIGURE 3 is a view in end elevation thereof,
FIGURE 4 is an end view showing the gun positioned within a J groove,
FIGURE 5 is a view similar to FIGURE 4 but showing a partially completed weld made by the gun, and
FIGURE 6 is a somewhat schematic side elevation showing the gun positioned within a J groove.

Referring now to the drawings, the reference character 10 generally indicates a MIG type arc welding gun characterized by a very slim and elongated housing 12. The housing comprises a pair of spaced outer walls 14 joined together at their leading and trailing edges by curved end portions 16 and having their upper edges connected to a horizontal upper wall 18. Typical dimensions for the housing are on the order of 3½″ high, 3⅛″ long, and $7/16$″ thick, for example.

Extending downwardly through the center of the housing 12 is a ceramic insulating sleeve 18 in which is mounted a wire guide and power pickup sleeve 20 fabricated from a conductive material such as copper or the like. An annulus 22 locks the sleeve 20 in position against the upper wall 18 of the housing. A conductive bushing 24 is mounted on the upper end of the conducting sleeve 20 for connection to a suitable power source 25.

Extending down through the center of the conducting sleeve 20 is a length of consumable electrode wire 26 which is fed continuously through the sleeve 20 as its lower projecting end is fused with the work. In practice, the wire 26 may be fed from a reel 27 or other suitable means adapted to deliver fresh sections of electrode into the gun as the electrode is consumed. Normally, the electrode is a wire of the same chemical composition as the work. In the preferred embodiment of the invention, an electrode having a diameter of about $1/16$″ is employed. This permits the use of a gun of minimum thickness. As is usual with arc welding guns, the work is made the positive terminal and the electrode the negative terminal when direct current is employed. With alternating current, welding polarity has no significance.

The gun housing 12 has a chambered interior which permits separately a flow of cooling medium through the housing and a flow of inert gas to the welding area. As shown in FIGURES 1 and 6, inert gas is introduced to the gun 10 through a tube 28 connected to an upper end portion of the gun and communicating with an upper chamber 30 formed by the upper wall 18, a transverse inner wall 32, and the side walls 14. The transverse wall 32 is formed with an opening 34 which communicates with a chamber 36 surrounding the lower portion of the electrode guide assembly. This chamber is defined by the outer walls 14 and a pair of vertical inner walls 38 which extend from the lower edges of the housing up to the transverse wall 32. The chamber 36 will be seen in FIG- URE 1 to be open at the bottom whereby gas introduced through the tube 28 will flow through the chamber 30, through the opening 34, down through the chamber 36, and out of the gun in a pattern that surrounds the electrode to keep the electrode tip covered by the gas during welding operations. Typically, the arc is in an atmosphere of argon or helium supplied at 5 to 100 cubic feet per hour from a gas source 37.

The cooling system for the gun comprises a pair of inlet conduits 40 and a pair of outlet conduits 42. The inlet conduits are connected to a cooling water source 44 and introduced the water to cooling chambers 46 which are located at both the forward and rearward portions of the gun. The chambers are formed by the side walls 14, the curved end portions 16, the transverse wall 32, the vertical walls 38, and a pair of bottom walls 48. The inlet conduit 40 passes down through an opening formed in the upper wall 18 through the chamber 30 and through an opening formed in the transverse wall 32. The outlet conduit 42 communicates with the chamber 46 through an opening formed in the curved end portion 16. In order to provide effective circulation and heat removal, a baffle 50 extends downwardly from the transverse wall 32 and terminates above the bottom wall 48. Thus, water introduced through the inlet tube 40 is forced to travel downwardly parallel to the electrode assembly and then upwardly again parallel to the electrode assembly to discharge through the outlet tube 42.

The gun described herein is capable of handling a current flow of 500 or more amperes with an electrode capacity of up to 1/16" diameter filler wire. The unique configuration of the device permits the entire assembly to be located within a groove 52 such as suggested in FIGURE 4. In FIGURE 4, two pieces of metal 54 and 56 are shown in position to be joined by means of the gun 10. The portions that are to be joined define a joint of J groove design wherein a pair of lower projecting lips 58 are formed along the opposing lower edges thereof to butt against one another. This arrangement defines the groove which will receive the gun and the weld. In FIGURE 4 the metal pieces 54 and 56 are on the order of 3" or so in thickness so that the gun 10 has a substantial portion of its housing within the groove 52.

In practice, when the weld is to be made, the electrode is energized by its power source, gas is introduced to the chamber 36, and the cooling water is circulated through the cooling chambers. Once in operation, the gun is moved longitudinally along the groove with the lower tip of the electrode bearing against the base of the groove. As the gun traverses the groove, a weld bead will be made along the bottom of the groove. This bead or weld strip will be gradually built up by making a number of passes with the gun back and forth along the groove. As shown in FIGURE 5, the weld connection is substantially completed as the built up weld approaches the upper level of the pieces that are being joined.

It will be appreciated that the time involved, the amount of electrode materials consumed, and the power requirements are substantially less than would be required to weld together a work of similar thickness using a V or double V joint. In addition the quality of the joint made by the gun described is substantially higher than a weld made with a V-joint. It will be appreciated that, even though the gun operates at a high temperature level, zones surrounding the work are protected from unnecessary softening by reason of the relatively small amount of molten material generated to perform the joint. Heat flow is concentrated in the welding zone, promoting a weld displaying small grain growth, in the limited heat affected zone, which characterizes high strength. Thus, the finished product is much less apt to suffer failure arising from softened heat affected zones. The gun described herein thereby makes possible high-strength joints rapidly with a low power output and with a minimum amount of weld material.

While the invention has been described with particular reference to the illustrated embodiment, it will be understood that numerous modifications thereto will appear to those skilled in the art. Also, it will be understood that the above description and accompanying drawings should be taken as illustrative of the invention and not in a limiting sense.

Having thus described my invention, what I claim and desire to obtain by Letters Patent of the United States is:

1. An arc welding gun for use in welding a workpiece having a deep narrow recess, comprising an elongated narrow housing dimensioned to fit edgewise within said recess and adapted to be moved longitudinally therealong, said housing having a length and height substantially greater than its width, a tubular guide extending edgewise through the center portion of said housing, means for electrically insulating said guide from said housing, said guide being adapted to support a length of consumable electrode wire extending coaxially therethrough and having its free end projecting from one edge of said housing for contact with said workpiece, means for connecting said wire to an electrical power source, walls within said housing defining a gas passage about said guide and along the length thereof, said gas passage being open at the free end of said guide, means for connecting said gas passage to a source of inert gas, said walls further defining a liquid passage extending in spaced parallel relation to said guide forwardly and rearwardly thereof, each of said liquid passages defining a double pass system along the length of said gas passage with one portion extending lengthwise of the gas passage in one direction and another portion extending in the reverse direction, and means for connecting said liquid passage to a source of liquid cooling medium, said gun being of substantially uniform thickness throughout.

2. An arc welding gun according to claim 1 wherein said connecting means are located on the peripheral edge of said housing and do not exceed the thickness of said gun.

References Cited by the Examiner

UNITED STATES PATENTS

| 2,829,240 | 4/58 | Ballington | 219—136 |
| 2,965,746 | 12/60 | Cresswell | 219—137 |
| 3,123,702 | 3/64 | Keidel et al. | 219—74 |

RICHARD M. WOOD, *Primary Examiner.*